United States Patent
Sumi et al.

(10) Patent No.: US 9,106,842 B2
(45) Date of Patent: Aug. 11, 2015

(54) VEHICLE IMAGE DISPLAY APPARATUS AND METHOD

(75) Inventors: Shogo Sumi, Ebina (JP); Daisuke Sugawara, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 394 days.

(21) Appl. No.: 13/232,146

(22) Filed: Sep. 14, 2011

(65) Prior Publication Data

US 2012/0069182 A1 Mar. 22, 2012

(30) Foreign Application Priority Data

Sep. 17, 2010 (JP) ................................. 2010-209040

(51) Int. Cl.
*H04N 5/247* (2006.01)
*B60R 1/00* (2006.01)
*H04N 5/232* (2006.01)
*H04N 7/18* (2006.01)

(52) U.S. Cl.
CPC ........ *H04N 5/247* (2013.01); *B60R 1/00* (2013.01); *H04N 5/23238* (2013.01); *H04N 7/181* (2013.01); *B60R 2300/105* (2013.01); *B60R 2300/303* (2013.01); *B60R 2300/305* (2013.01); *B60R 2300/607* (2013.01)

(58) Field of Classification Search
USPC ............ 348/148; 382/103–104, 284; 340/435
See application file for complete search history.

(56) References Cited

U.S. PATENT DOCUMENTS

| | | | |
|---|---|---|---|
| 7,161,616 B1* | 1/2007 | Okamoto et al. ............. | 348/148 |
| 7,583,184 B2* | 9/2009 | Schofield et al. ............. | 340/438 |
| 7,883,184 B2* | 2/2011 | Sugahara ........................ | 347/55 |
| 2003/0137586 A1* | 7/2003 | Lewellen ....................... | 348/148 |
| 2006/0164230 A1* | 7/2006 | DeWind et al. ............... | 340/461 |
| 2008/0012940 A1* | 1/2008 | Kanaoka et al. .............. | 348/148 |
| 2009/0102921 A1* | 4/2009 | Ito et al. ......................... | 348/148 |
| 2009/0102922 A1 | 4/2009 | Ito et al. | |
| 2009/0128630 A1* | 5/2009 | Kanaoka et al. .............. | 348/148 |
| 2010/0066833 A1* | 3/2010 | Ohshima et al. .............. | 348/148 |
| 2010/0070139 A1 | 3/2010 | Ohshima et al. | |
| 2010/0110194 A1* | 5/2010 | Euler et al. .................... | 348/149 |
| 2010/0118146 A1* | 5/2010 | Schofield et al. ............. | 348/148 |
| 2010/0134325 A1* | 6/2010 | Gomi et al. ............... | 340/995.14 |

(Continued)

FOREIGN PATENT DOCUMENTS

| | | |
|---|---|---|
| CN | 1174623 C | 11/2004 |
| CN | 1825951 A | 8/2006 |
| CN | 101102482 A | 1/2008 |

(Continued)

*Primary Examiner* — Jeremiah C Hallenbeck-Huber
*Assistant Examiner* — Samuel D Fereja
(74) *Attorney, Agent, or Firm* — Young Basile (57) ABSTRACT

A vehicle image display apparatus and method acquires captured images of an area around a vehicle captured by cameras at a plurality of positions on an outer portion of the vehicle, generates a single image based on the captured images and displays a composite image including the single image superposes with a first image showing boundary regions of the captured images in the single image and a second image showing end regions of the vehicle. When the composite image is displayed for the first time after an input operation is given to an ignition key of the vehicle, the first and second images are highlighted for a time period after the composite image starts to be displayed. After the time period elapses, the first image is non-highlighted and the second image is highlighted.

20 Claims, 10 Drawing Sheets

(56) References Cited

U.S. PATENT DOCUMENTS

2010/0259615 A1* 10/2010 Yamamoto .................... 348/148
2012/0062743 A1* 3/2012 Lynam et al. ................. 348/148

FOREIGN PATENT DOCUMENTS

| | | |
|---|---|---|
| CN | 101489117 A | 7/2009 |
| EP | 1876813 A2 | 1/2008 |
| JP | 01-261787 | 10/1989 |
| JP | 10-285607 | 10/1998 |
| JP | 2002-314991 | 10/2002 |
| JP | 2008-33901 | 2/2008 |
| JP | 2009-040107 | 2/2009 |
| JP | 2010136082 A | 6/2010 |
| WO | 2007029578 A1 | 3/2007 |
| WO | 2009141846 A1 | 11/2009 |

* cited by examiner

VEHICLE IMAGE DISPLAY APPARATUS AND METHOD

CROSS-REFERENCE TO RELATED APPLICATION

This application claims priority to JP Patent Application No. 2010-209040, filed Sep. 17, 2010, the entire content of which is incorporated herein in its entirety by reference.

TECHNICAL FIELD

The present invention relates to a vehicle image display apparatus and a method that combine images captured by a plurality of cameras mounted on a vehicle and generate a monitor image of an area around the vehicle from a virtual viewpoint in an area above the vehicle.

BACKGROUND

For this type of apparatus and method, there is known a technique that highlights connected lines of respective captured images for a predetermined time when a monitor image of an area around a vehicle from a virtual viewpoint in an area above the vehicle is displayed for the first time after an input operation is given to an ignition switch. Such a technique is shown in Japanese Unexamined Patent Application Publication No. 2008-33901, for example.

However, with that technique, end portions of the vehicle, on which occupant's mind should be concentrated the most, become less noticeable since the connected lines of the captured images are highlighted. Hence, visibility of the end portions of the vehicle is degraded.

BRIEF SUMMARY

Embodiments of the invention display a monitor image designed to cause an occupant's mind to be concentrated on an end portion of a vehicle when a monitor image of an area around the vehicle is displayed by making the occupant aware of both the positions of boundaries of respective captured images and of the end portions of the vehicle and by making the end portions of the vehicle relatively noticeable.

An aspect of the present invention highlights a first image showing boundary regions of captured images and a second image showing end regions of a vehicle and then non-highlights the first image showing the boundary regions while highlighting the second image showing the end regions of the vehicle.

According to embodiments described herein, the relationship between the highlighting level of the first image showing the boundary regions and the second image showing the end regions of the vehicle is changed with time. After a time period (such as a predetermined time) elapses, the second image is relatively highlighted as compared with the first image. Accordingly, the monitor image is capable of making the occupant aware of both positions of the boundaries of the respective images and the end portions of the vehicle and is further capable of directing an occupant's attention to be concentrated on the end portions of the vehicle.

Details of these embodiments and variations in these embodiments and others is described in detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Embodiments of the present invention will be described below with reference to the drawings. Described in these embodiments is an example in which a vehicle image display apparatus according to the present invention is applied to a vehicle image display system 1000 mounted on a vehicle.

Figure 1:
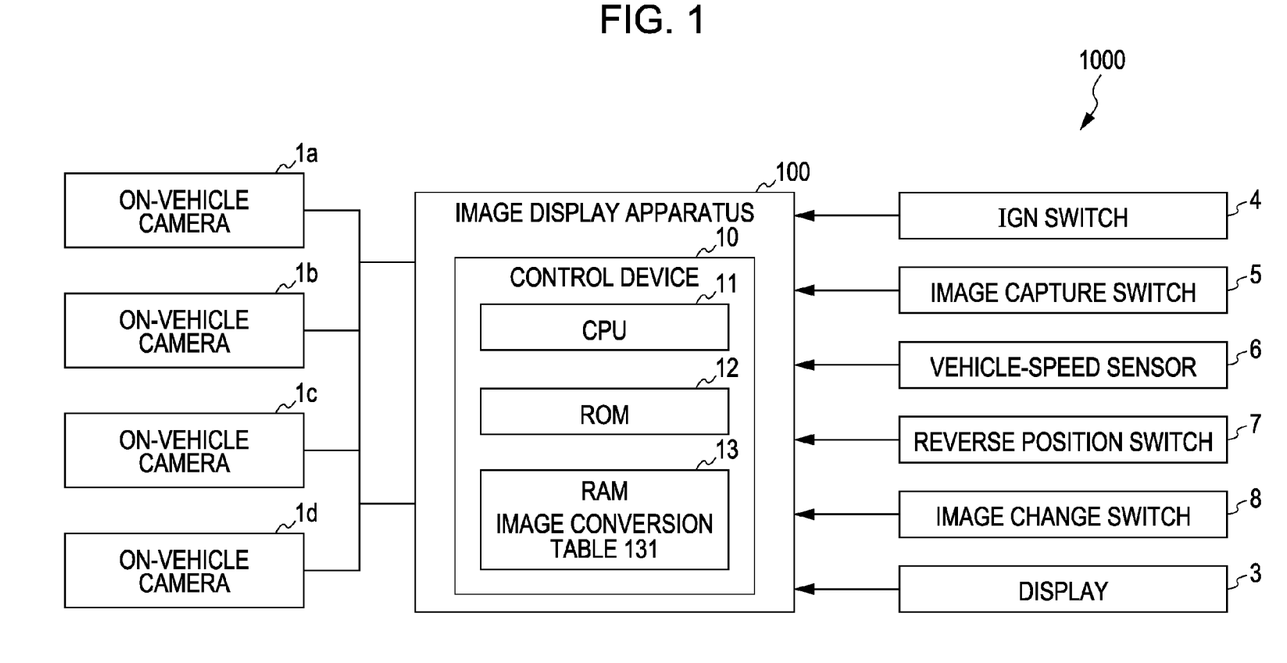
FIG. 1 is a schematic diagram of a vehicle image display system including an image display apparatus according to an embodiment of the present invention.

FIG. 1 is a schematic diagram of the vehicle image display system 1000 including an image display apparatus 100 according to an embodiment. As shown in FIG. 1, the vehicle image display system 1000 includes, in addition to the image display apparatus 100, four on-vehicle cameras 1a to 1d fixed at an outer portion of a vehicle, an ignition switch (IGN Switch) 4, an image capture switch 5 that operates the image display apparatus 100, a vehicle-speed sensor 6, a reverse position switch 7 that outputs a signal when a shift position is at a reverse position, an image change switch 8 that changes an image that is displayed on a display region of a monitor image S (described later), and a display 3 that displays a captured image and a monitor image. These devices are connected with each other through a controller area network (CAN) or other on-vehicle local area network (LAN), and hence can mutually give and receive information.

As shown in FIG. 1, a control device 10 of the image display apparatus 100 according to this embodiment includes a read only memory (ROM) 12 storing a program that causes a generated monitor image to be displayed in a predetermined form, a central processing unit (CPU) 11 serving as an operation circuit that causes the image display apparatus 100 to function by executing the program stored in the ROM 12, and a random access memory (RAM) 13 that functions as an accessible storage device. Control device 10 can thus be a microcomputer integrating the on-board CPU 11 and the RAM 13 that is coupled to external ROM 12 or has on-board ROM 12, or the control device 10 can be comprised of the CPU 11 coupled to external RAM 13 and ROM 12. The control device 10 may also be implemented in whole or in part by other hardware devices such as application-specific integrated circuits (ASICs), etc.

The control device 10 of the image display apparatus 100 according to this embodiment has a captured-image acquisition function, a composite-image generation function and a display control function. The control device 10 of this embodiment can execute the functions in cooperation with software for realizing the functions and the above-described hardware.

The functions realized by the control device 10 of the image display apparatus 100 are next described.

First, the captured-image acquisition function of the control device 10 is described. When an input operation is given to the ignition switch 4, the control device 10 in this example causes the on-vehicle cameras 1a to 1d to capture images of an area around the vehicle. When a user gives an ON operation to the image capture switch 5, or the reverse position switch 7 outputs an ON signal (i.e., when the reverse position is selected as the shift position), the control device 10 operates the screen M (see FIG. 7) to display the captured images. Specifically, the screen M is divided into a left section and a right section. A monitor image S is displayed in the left section, and a captured image P of one of the on-vehicle cameras 1a-1d is displayed in the right section. The details of the captured images will be described later.

Figure 2:
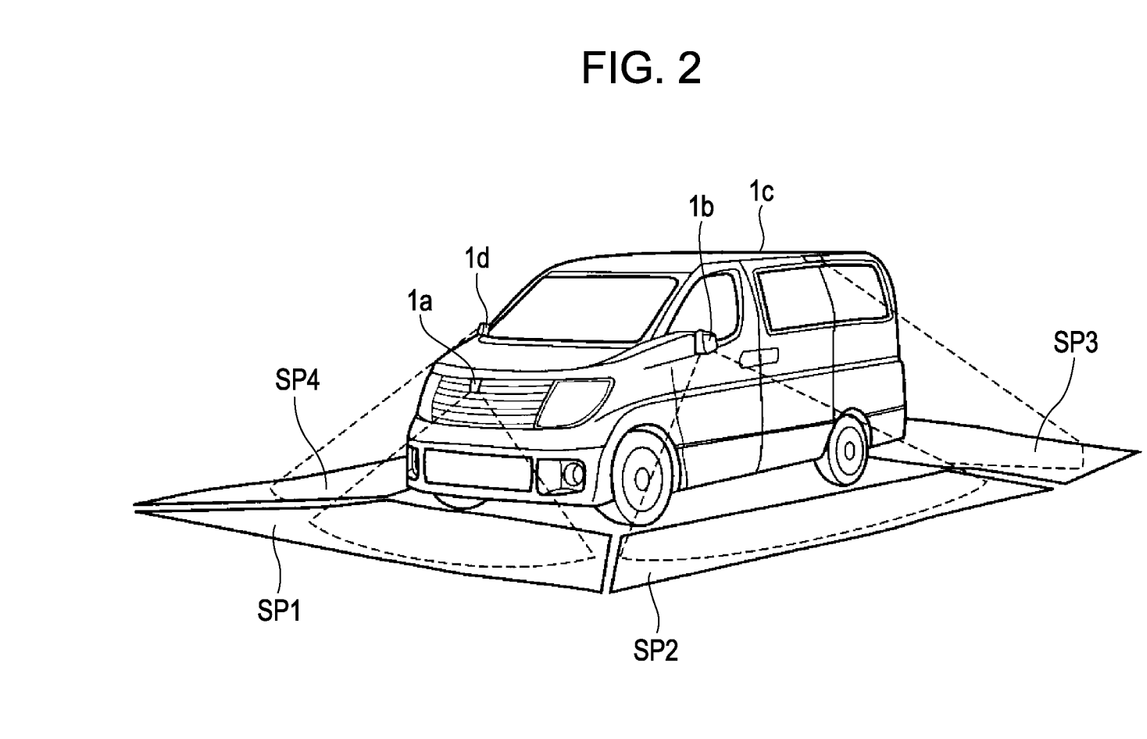
FIG. 2 is a perspective view of a vehicle equipped with the image display apparatus according to FIG. 1 showing an example of mounted positions and capturing areas of on-vehicle cameras.

FIG. 2 is perspective view of the vehicle equipped with the image display apparatus 100 showing an arrangement example when the on-vehicle cameras 1a to 1d are mounted on the vehicle. The on-vehicle cameras 1a to 1d are mounted at different positions on the outer portion of the vehicle and capture images of a respective area around the vehicle in four directions. For example, as shown in FIG. 2, the on-vehicle camera 1a that is arranged at a predetermined position in a front section of the vehicle (e.g. at a position near the front grill) captures an image of a predetermined capturing area SP1 at the front side of the vehicle (hereinafter referred to as a front view image). The on-vehicle camera 1b arranged at a predetermined position in a left section of the vehicle (e.g. at the left side mirror) captures an image of a predetermined capturing area SP2 at the left side of the vehicle (hereinafter referred to as left side view image). The on-vehicle camera 1c arranged at a predetermined position in a rear section of the vehicle (e.g. at the roof spoiler) captures an image of a predetermined capturing area SP3 at the rear side of the vehicle (hereinafter referred to as rear view image). The on-vehicle camera 1d arranged at a predetermined position in a right section of the vehicle (e.g. at the right side mirror) captures an image of a predetermined capturing area SP4 at the right side of the vehicle (hereinafter referred to as right side view image). The four on-vehicle cameras 1a to 1d send captured images to the image display apparatus 100. The control device 10 acquires the captured images respectively from the on-vehicle cameras 1a to 1d.

Next, the composite-image generation function of the control device 10 is described. The control device 10 of an embodiment generates a single composite image based on the acquired captured images of the on-vehicle cameras 1a to 1d. In the composite image, the vehicle and an area around the vehicle are viewed from a virtual viewpoint in an area above the vehicle. The control device 10 converts the captured images acquired by the on-vehicle cameras 1a to 1d at the different positions into coordinates of the composite image by referencing an image conversion table 131 (see FIG. 1) indicative of the correspondence between a pixel address in each of the captured images and an address in the composite image. The control device 10 combines the captured images after the coordinate conversion and generates a single composite image showing a state of the vehicle and a state around the vehicle.

Figure 3:
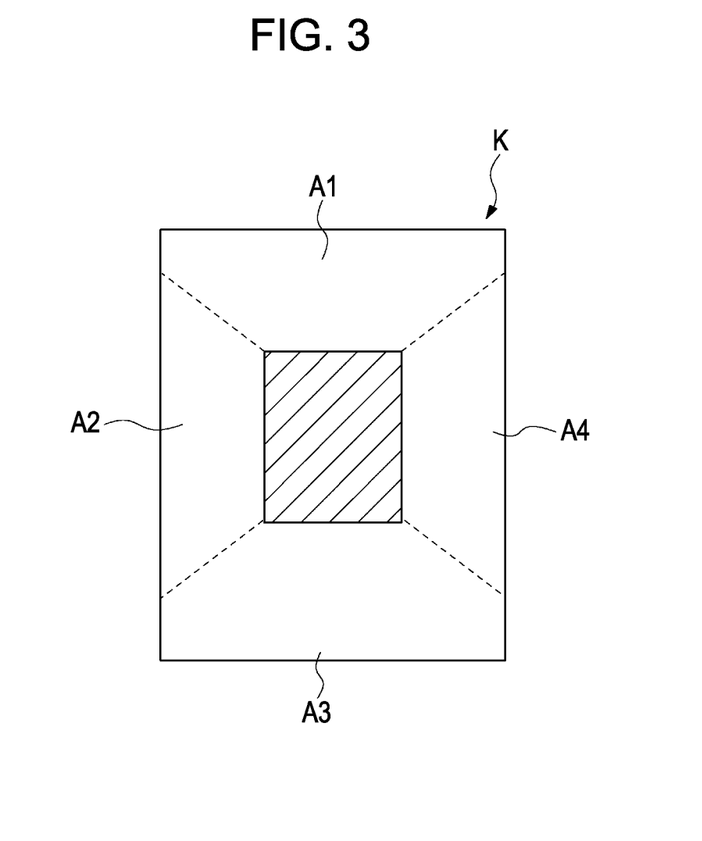
FIG. 3 is a pictorial representation showing an example of a composite image.

FIG. 3 is a pictorial representation showing an example of a composite image K. The composite image K shown in FIG. 3 is generated by combining partial composite images A1, A2, A3 and A4 that are obtained by converting viewpoints of the front view image, left side view image, rear view image and right side view image respectively captured by the on-vehicle cameras 1a to 1d shown in FIG. 2. A rectangular portion indicated by oblique lines in the composite image K shown in FIG. 3 is a portion in which the vehicle is present. By superposing an image of the vehicle viewed from the virtual viewpoint in the area above the vehicle, the composite image K can be generated such that the vehicle and the area around vehicle are viewed from the virtual viewpoint in the area above the vehicle.

Figure 4A:
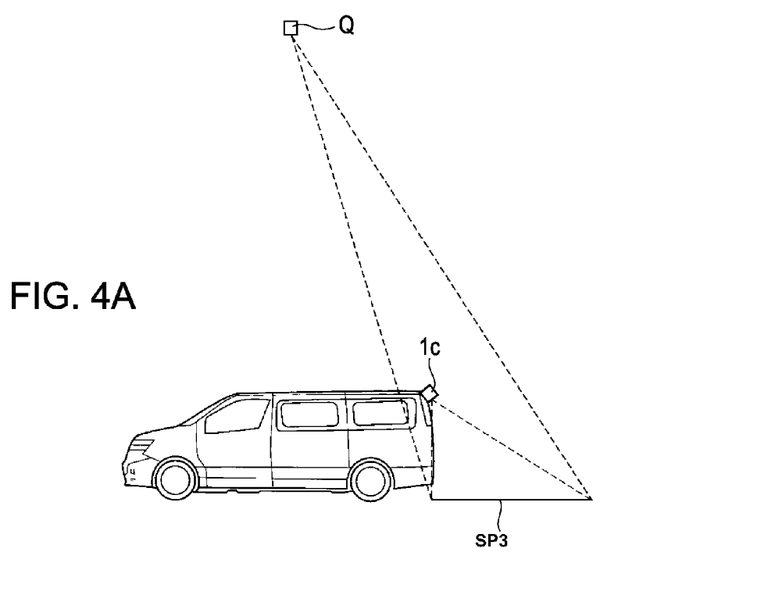
FIG. 4A is a pictorial representation showing a position of an on-vehicle camera, a position of a virtual viewpoint and a capturing area.
Figure 4B:
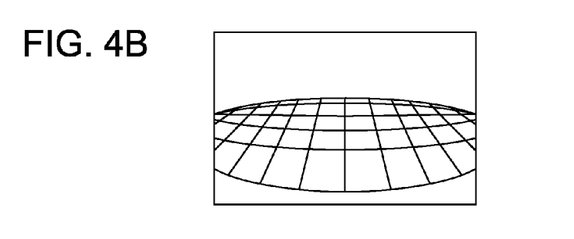
FIG. 4B is a pictorial representation showing a captured image before viewpoint conversion.
Figure 4C:
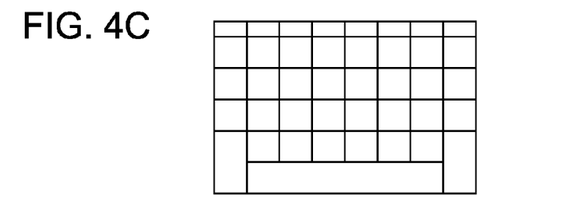
FIG. 4C is a pictorial representation showing a composite image after the viewpoint conversion.

A method of generating the composite image K is not particularly limited. For example, a captured image of FIG. 4B obtained by capturing the area SP3 from a viewpoint of the on-vehicle camera 1c in FIG. 4A is converted into a downward-view image as shown in FIG. 4C. The downward-view image is generated by simulating image capture from a virtual viewpoint Q that is located directly above the vehicle as shown in FIG. 4A. The downward-view image is an image of the area SP3 such that the vehicle and the area around the vehicle are viewed downward from the virtual viewpoint Q from an area just above the center of the vehicle. The correspondence between a coordinate value of the captured image of FIG. 4B and a coordinate value of the downward-view image of FIG. 4C before and after the conversion can be uniquely defined in the conversion table 131 in accordance with characteristics of a mounted angle of a lens of the on-vehicle camera 1c.

Next, the display control function of the control device 10 is described with reference to FIGS. 5 and 6. The control device 10 of an embodiment causes a monitor image S to be displayed on the display 3 in a predetermined form in which a first image L1 showing boundary regions R and a second image L2 showing end regions E of the vehicle are superposed on the composite image K.

Figure 5:
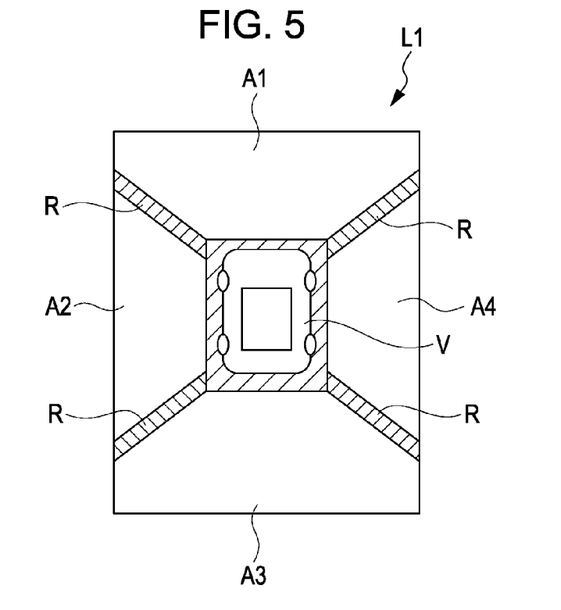
FIG. 5 is a pictorial representation showing an example of a first image.

FIG. 5 is a pictorial representation showing an example of the first image L1. The first image L1 includes respective boundary regions R between a plurality of captured images that form the composite image K. The control device 10 previously stores a single or plurality of first images L1 in accordance with a position of the on-vehicle cameras 1a-1d, a capturing range of the on-vehicle cameras 1a-1d, a position of the virtual viewpoint Q and a displaying range of the composite image K.

A vehicle image V shown in FIG. 5 is a computer graphic (CG) image that is a plan view of the vehicle when viewed downward from the virtual viewpoint Q so that the occupant of the vehicle recognizes the position of the vehicle in the monitor image. The vehicle image V may be stored as part of the first image L1 or as image data provided separately from the first image L1.

The control device 10 of this embodiment performs coordinate conversion for captured images captured at different positions, combines these images and generates a single composite image K. Hence, the degree of distortion of an image is increased at the boundary between regions obtained as the result of the composition of the different captured images (that is, the boundaries between regions of the partial composite images A1, A2, A3 and A4). The continuity of such an image is degraded. In particular, when a three-dimensional (3-D) object on a road is displayed at connected lines of the partial composite images A1, A2, A3 and A4 of the composite image K, it may be difficult to recognize the 3-D object due to discontinuity of the image.

To address this, the control device 10 of this embodiment superposes the first image L1, showing the boundary regions R of the partial composite images A1, A2, A3 and A4, on the composite image K and displays the result as the monitor image S. As described above, by superposing the first image L1 showing the boundary regions R on the composite image K and displaying the result, the occupant can recognize that the composite image K is formed of a plurality of captured images, and that an image of an area near the boundary regions R is less accurate.

Also, the control device 10 of this embodiment previously stores the second image L2 showing the end regions E of the vehicle in the composite image K.

Figure 6:
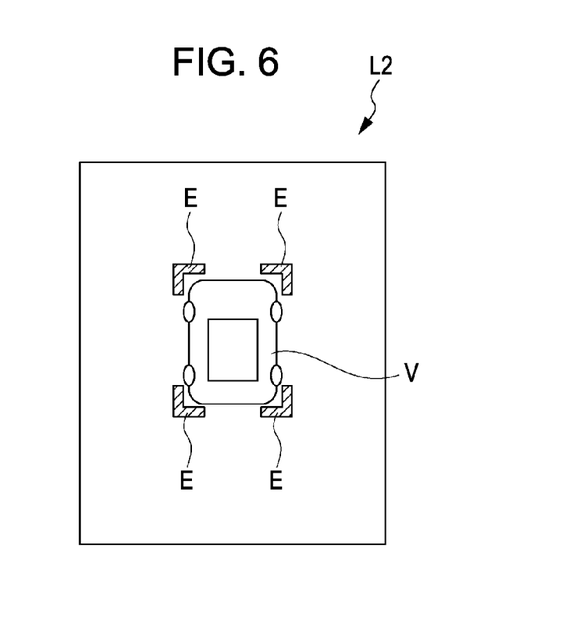
FIG. 6 is a pictorial representation showing an example of a second image.

FIG. 6 is a pictorial representation showing an example of the second image L2. As shown in FIG. 6, the second image L2 includes four corners of the vehicle, front and rear ends of the vehicle, cover surfaces of tires attached to both sides of the rear section of the vehicle, and marks indicative of the end regions E in a form of angle brackets showing ends (edge portions) of the vehicle, such as left and right surfaces of the vehicle. The end regions E can be properly defined with margins of predetermined distances from external front, rear and side surfaces of the vehicle. The form of the marks is not particularly limited as long as the edge portions of the vehicle can be indicated. The form of the marks may be a form drawn by lines, such as a circle, a rectangle, a triangle or an arrow, or may be an image like a character.

The control device 10 of this example generates the monitor image S by superposing the first image L1 showing the boundary regions R, the second image L2 showing the end regions E and the vehicle image V on the composite image K as described above, and displays the monitor image S on the in-vehicle display 3.

Figure 7:
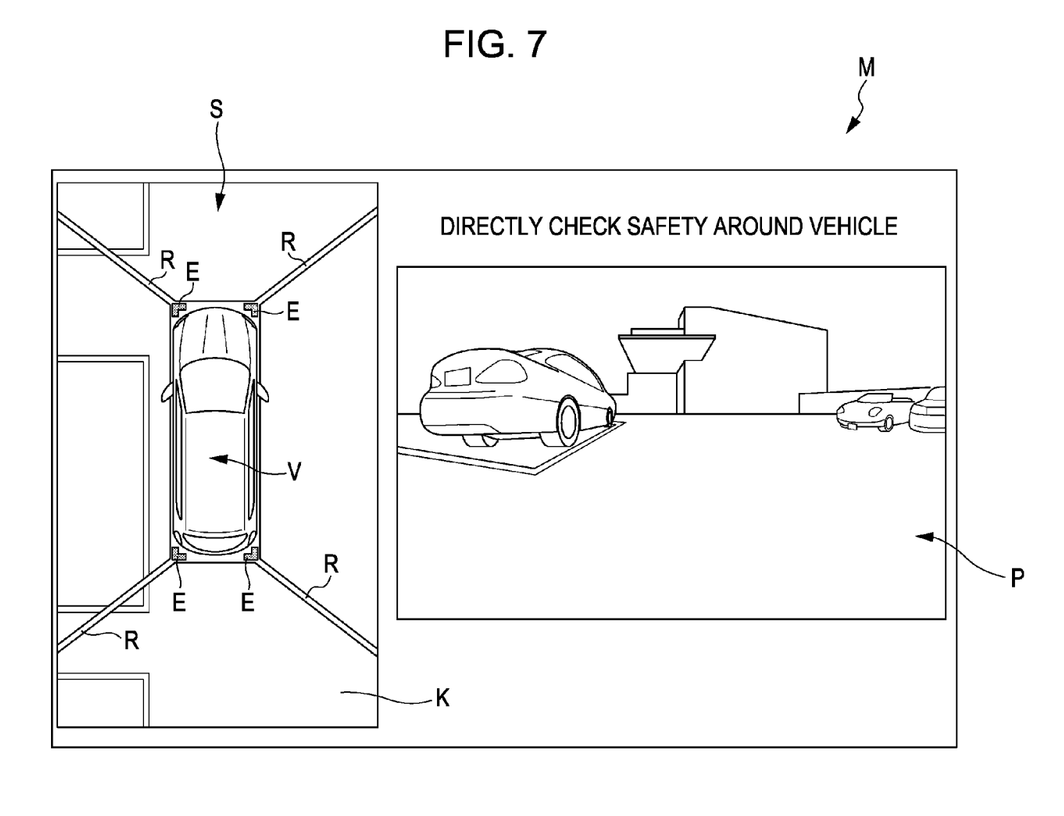
FIG. 7 is a pictorial representation showing a display example of a monitor image.

FIG. 7 is a pictorial representation of an example of the monitor image S of an embodiment. As shown in FIG. 7, a screen M of the display 3 is divided into a left section and a right section. The monitor image S is displayed in the left section, and a captured image P obtained from the on-vehicle camera 1a or 1c is displayed in the right section. The captured image P in FIG. 7 can be an image captured by any of the on-vehicle cameras 1a-1d. When the reverse position switch 7 is ON, that is, when the shift position is at the reverse position, an image captured by the on-vehicle camera 1c arranged at the rear section of the vehicle is displayed. When the reverse position switch is OFF, an image captured by the on-vehicle camera 1a arranged at the front section of the vehicle is displayed. The display layout of the screen M is not particularly limited, and may be determined as desired. Also, by performing an operation via the image change switch 8, the image displayed in the left section of the screen M can be changed. A captured image near a front wheel at the side of a front passenger's seat (in the case of left-hand traffic, a seat in the left section of the vehicle), which may be a blind spot of a driver, is cut and extracted from the left side view image captured by the on-vehicle camera 1b (called a side monitor image). The operation via the image change switch 8 can change an image between the side monitor image (not shown) and the monitor image S. In FIG. 7, the left display region displays the monitor image S when the display is changed from, for example, a route guide image. When a user performs the operation via the image change switch 8, the display is changed to the side monitor image. Then, when the user performs the operation via the image change switch 8 again, the display is changed to the monitor image S.

As described above, the monitor image S shown in FIG. 7 is an image in which both the first image L1 and the second image L2 are superposed on the composite image K. Essentially, the images L1 and L2 are layered with the vehicle image V. For convenience of a vehicle operation by an occupant, it is desirable in this example to display a monitor image S such that the occupant recognizes the boundary regions R and the occupant's attention is most concentrated on the end regions E of the vehicle.

Hence, in the image display apparatus 100 of this embodiment, after an input operation is given to the ignition switch 4 of the vehicle, i.e., after the occupant enters the vehicle, if the monitor image S is displayed for the first time, both the first image L1 and the second image L2 included in the monitor image S are highlighted for a predetermined time since display of the monitor image S has just started. After the predetermined time elapses, the first image L1 becomes non-highlighted, and the second image L2 remains highlighted. In particular, within the predetermined time since display of the monitor image S was started, both the boundary regions R and the end regions E are highlighted. After the predetermined time elapses, highlighting of the boundary regions R is stopped, and the end regions E are continuously highlighted such that the end regions E become more noticeable than the boundary regions R. The predetermined time may vary as desired. The predetermined time may be a value in a range from 5 to 8 seconds, for example. Seven seconds may be sufficient for the occupant to recognize the positions of the boundary regions R and the end regions E of the monitor image S.

Such a display form can give the impression of the positions of the boundary regions R and the end regions E of the vehicle to the occupant who watches the monitor image S, for the first time after the occupant enters the vehicle, by displaying the monitor image S in which both the boundary regions R and the end regions E of the vehicle are highlighted. After the predetermined time elapses, the boundary regions R are non-highlighted, whereas the end regions E of the vehicle remain highlighted. Thus, the end regions E can be more noticeable than the boundary regions R.

Also, the image display apparatus 100 can change the display form of the second image L2 showing the end regions E of the vehicle after the predetermined time from the display form shown before the predetermined time elapses. In particular, the second image L2 showing the end regions E is highlighted in a first form for a predetermined time from the start of display of the monitor image S. After the predetermined time elapses, the second image L2 is highlighted in a second form that is different from the first form. For example, the second image L2 is displayed by blinking with an accent color such as red for a predetermined time after the start of the display of the composite image K. After the predetermined time elapses, the second image L2 is displayed by thick lines with the color of red. Of course, the second image L2 may be displayed with another accent color. Alternatively or additionally thereto, luminance may be increased or decreased after the predetermined time from that displayed during the predetermined time. Since the display form (way of highlighting) of the second image L2 that remains highlighted even after the predetermined time elapses, the occupant's attention can be continuously concentrated on the end regions E because highlighting is continuously provided.

Further, while both the first image L1 showing the boundary regions R and the second image L2 showing the end regions E of the vehicle are highlighted for the predetermined time after display of the monitor image S is started, the display form of the second image L2 may be different from the display form of the first image L1. For example, the boundary regions R of the first image L1 may be displayed by an accent color such as yellow, and the end regions E of the second image L2 may be displayed by another accent color such as red. Alternatively, the boundary regions R of the first image L1 may be displayed with a relatively high luminance, and the end regions E of the second image L2 may be displayed by blinking. As described above, since the first image L1 and the second image L2 are highlighted in different forms, the occupant can clearly distinguish the boundary regions R and the end regions E, which are highlighted simultaneously within the predetermined time, from one another.

In contrast to known display methods, if the monitor image S is displayed for a second time after the input operation is given to the ignition switch 4 of the vehicle (and after the predetermined time elapses), the first image L1 showing the boundary regions R may be non-highlighted, and the second image L2 showing the end regions E may be highlighted.

When the occupant watches the monitor image S during a driving event between the time the occupant enters the vehicle until the occupant exits the vehicle, the occupant should be notified of the presence of the boundary regions R and the degradation in accuracy of the image around the boundary regions R. Hence, embodiments described herein provide this notification for a first time (e.g. the predetermined time). However, when the occupant watches the monitor image S for the second time or more during the same riding (driving), it can be expected that the occupant already recognizes the boundary regions R. Hence, when the occupant watches the monitor image S for the second time or more after the occupant enters the vehicle (and after the first time), only the end regions E of the vehicle are highlighted. Accordingly, the occupant's attention can be concentrated on the positions of the end portions E of the vehicle.

Now, highlighting and non-highlighting of the monitor image S according to this embodiment are described.

In this embodiment, highlighting of an image represents a display form that gives a relatively strong stimulus to visual perception of the occupant and relatively strongly attracts the occupant's attention. For example, the highlighting includes blinking in contrast to non-blinking; displaying with a high luminance in contrast to displaying with a low luminance; displaying with an advancing color, a line diagram colored with an advancing color being relatively close to a viewer, in contrast to displaying with a receding color, a line diagram colored with a receding color being relatively far from a viewer; displaying with a thick line in contrast to displaying with a thin line; and displaying with a single line in contrast to displaying with multiple lines.

Also in this embodiment, non-highlighting of an image represents a display form having a relatively small effect to attract the occupant's attention. For example, the non-highlighting includes non-blinking in contrast to blinking; displaying with a low luminance in contrast to displaying with a high luminance; displaying with a receding color such that a line diagram colored with a receding color is relatively far from a viewer, in contrast to displaying with an advancing color such that a line diagram colored with an advancing color is relatively close to a viewer; displaying with a thin line in contrast to displaying with a thick line; and displaying with multiple lines in contrast to displaying with a single line.

More specifically, blinking is performed by repeatedly displaying and non-displaying a layer image L1 and/or L2 of composite image K at a predetermined period or by repeatedly turning ON and turning OFF a light or lights associated with boundary regions R and/or end regions E at a predetermined period. Also, displaying with a high luminance is means displaying layer image L1 and/or L2 where a luminance is relatively increased as compared to the luminance of the image either before or after the predetermined time and/or as compared to the luminance of the other image. An advancing color is a color selected so that a line diagram colored with that color appears relatively close to a viewer. Referring to the hue circle, an advancing color can be a color that is a warm color with a relatively high lightness and a relatively high color saturation. For example, an advancing color is yellow, orange or red. In contrast, a receding color is a color selected such that a line diagram colored with that color appears relatively far from a viewer. Referring to the hue circle, a receding color is a color that is a cold color with a relatively low lightness and a relatively low color saturation. For example, a receding color is blue, purple or black. An image displayed with an advancing color looks relatively highlighted. Also, an image displayed yellow or red with a high lightness can be displayed in a relatively highlighted form. Further, in the "JIS Z9101 Safety colours and safety signs," yellow has a meaning of "caution" and red has a meaning of "stop." Thus, yellow or red may be desirably used as highlighting to implicate these meanings. Alternatively, yellow, which is the lightest of the chromatic colors, may be used for highlighting, and black, which is the darkest complementary color to yellow, may be used for non-highlighting. A combination of yellow and black is noticeable, and hence the boundary regions R and the end regions E can be clearly displayed. Also, the thickness of a line diagram for highlighting and the thickness of a line diagram for non-highlighting may be differently defined.

The display method of the monitor image S by the image display apparatus 100 according to this embodiment is described in detail with reference to FIGS. 8 to 11.

Figure 8:
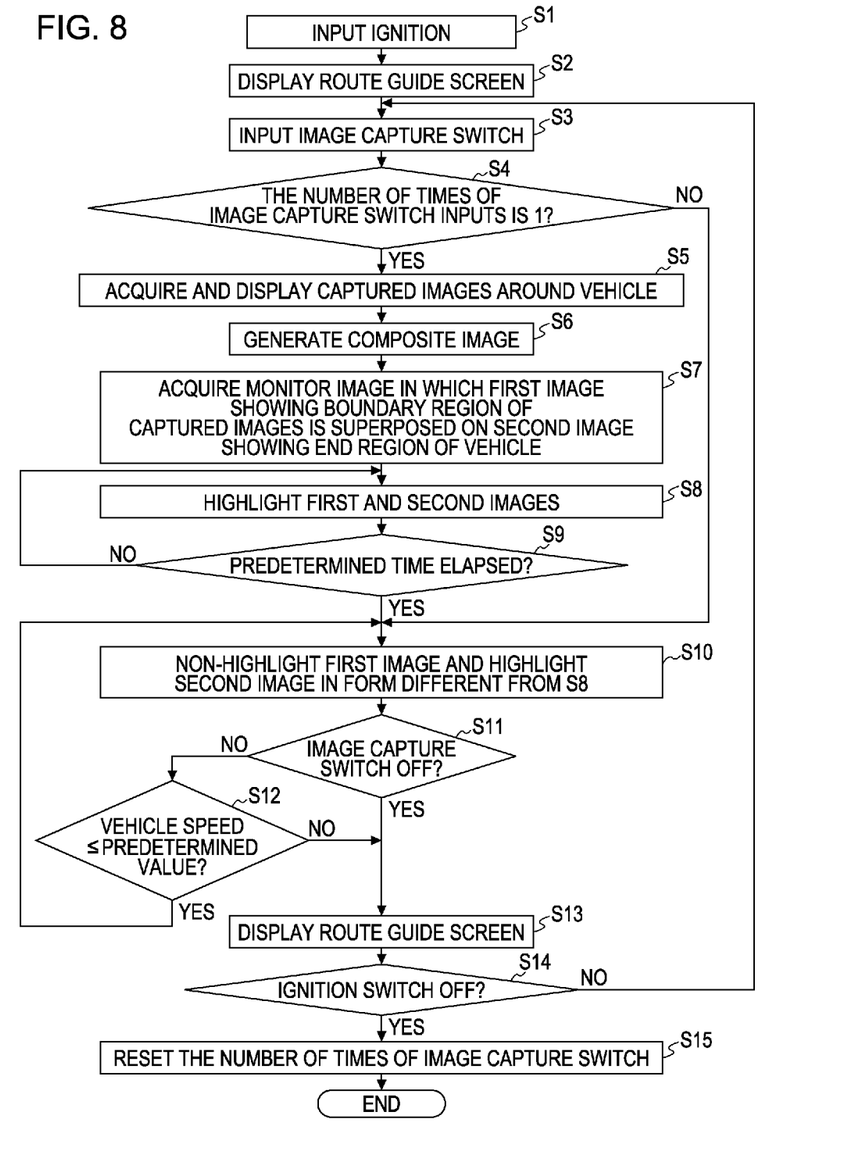
FIG. 8 is a flowchart showing a control procedure of the vehicle image display system according to an embodiment of the present invention.
Figure 9:
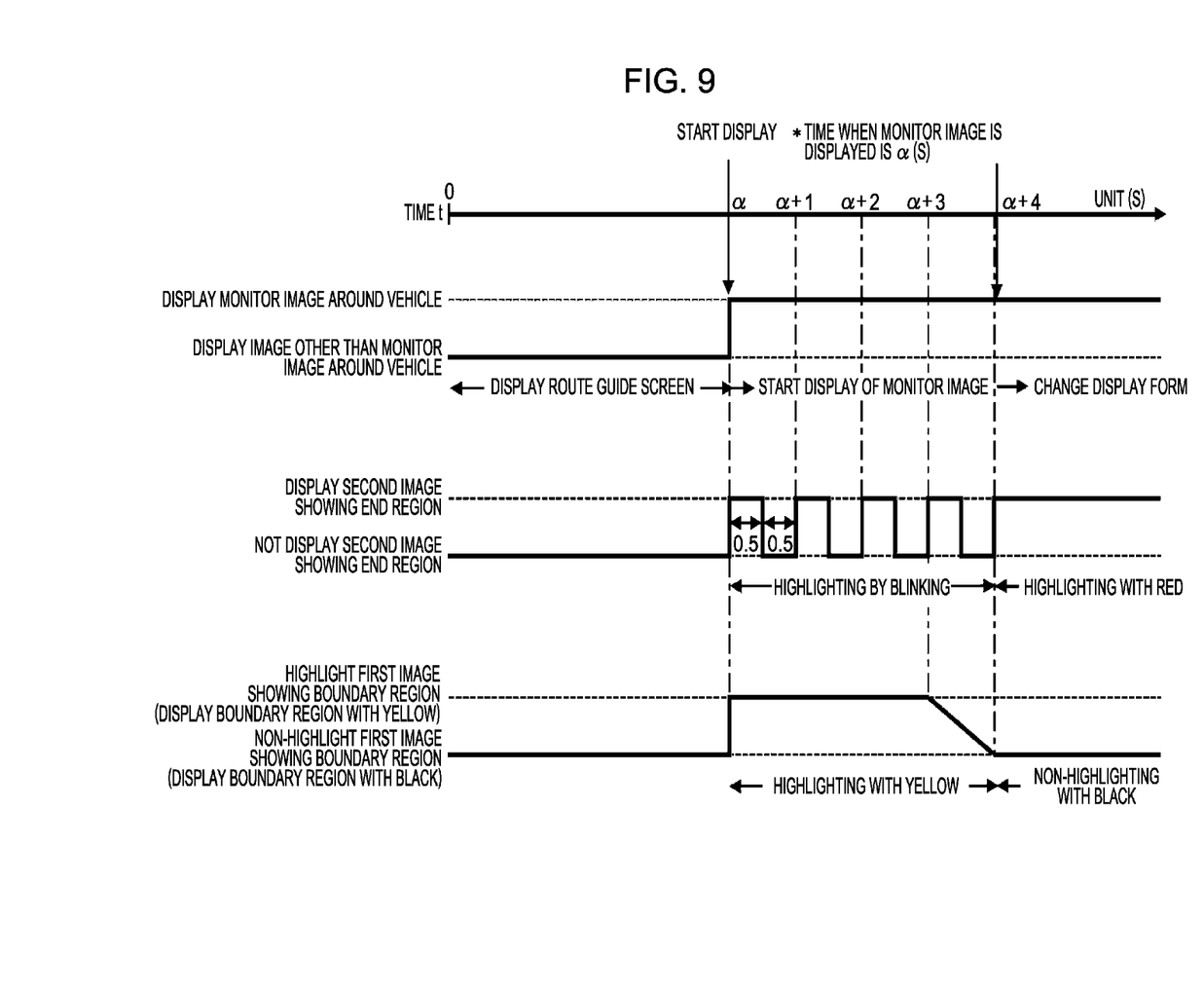
FIG. 9 is a time chart relating to display control of a monitor image.
Figure 10:
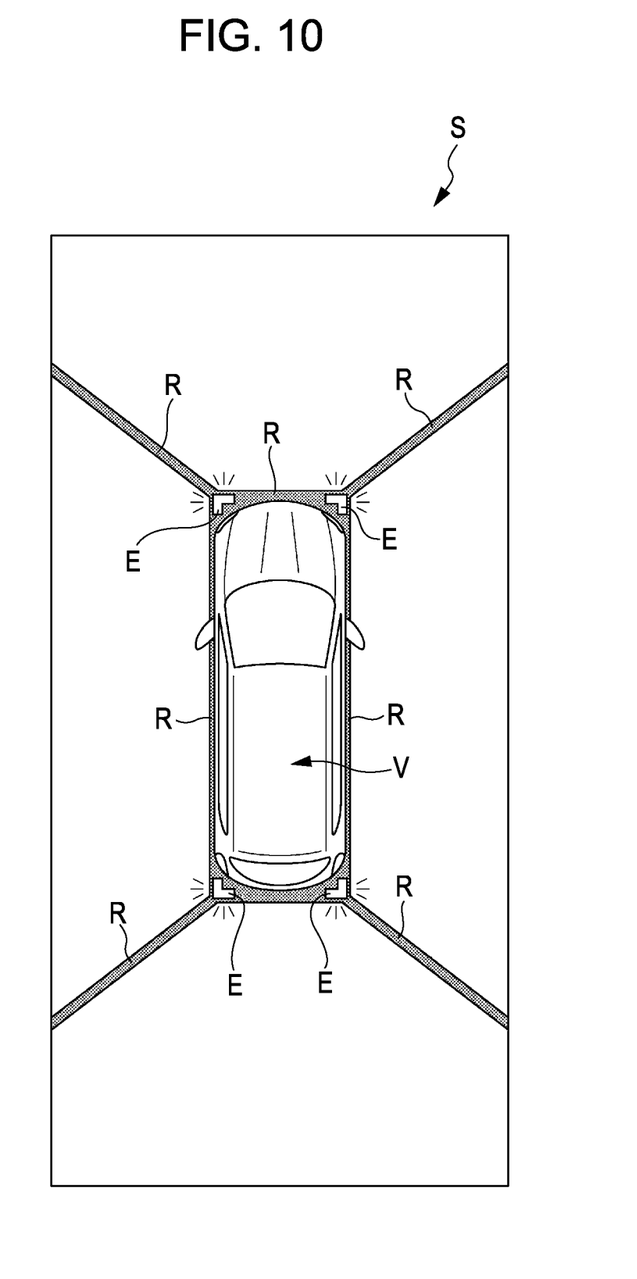
FIG. 10 is a pictorial representation showing an example of a monitor image.
Figure 11:
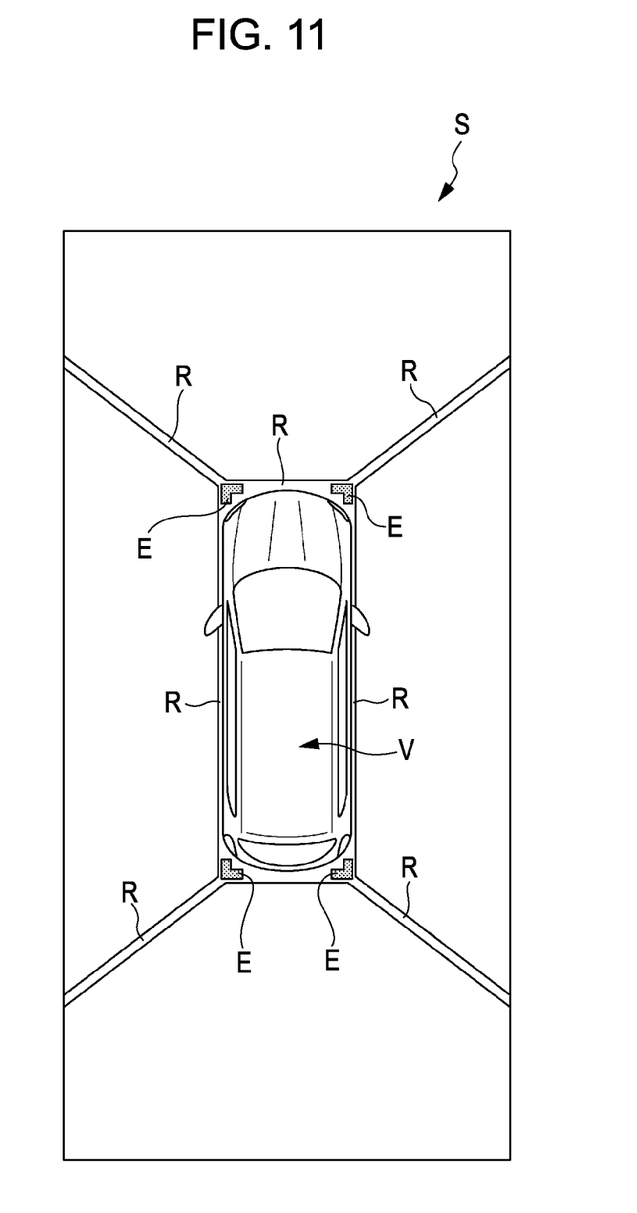
FIG. 11 is a pictorial representation showing another example of a monitor image.

FIG. 8 is a flowchart showing a control procedure of the vehicle image display system 1000 according to an embodiment of the present invention. FIG. 9 is a time chart relating to display control of the monitor image S. FIG. 10 is a pictorial representation showing a monitor image S in a first display form. FIG. 11 is a pictorial representation showing a monitor image S in a second display form.

As shown in the flowchart of FIG. 8, in step S1, when the input operation is given to the ignition switch 4 of the vehicle, the image display apparatus 100 is activated. The image display apparatus 100 stores a timing at which the input operation is given to the ignition switch 4 as a timing at which the occupant enters the vehicle. This information is used in step S4 (described later) as information for determining whether the monitor image S, which is going to be displayed, is viewed for the first time, or for the second time or more since the occupant enters the vehicle.

In step S2, the image display apparatus 100 displays an initial screen, such as a route guide screen, on the display 3. In step S3, the image display apparatus 100 starts display processing of the monitor image S when an input operation is given to the image capture switch 5 by the occupant. The display processing of the monitor image S may be started not only when the occupant-initiated input operation is given to the image capture switch 5 but also when the reverse position switch 7 outputs the ON signal. Here, the input operation of the image capture switch 5 and the ON signal of the reverse position switch 7 are collectively named the "input operation of the image capture switch 5."

In step S4, before the display processing of the monitor image S is started, the image display apparatus 100 determines whether or not the input operation of the image capture switch 5 is given for the first time after the input is given to the ignition switch 4. That is, after the input is given to the ignition switch 4, it is determined whether or not the number of times the input operation of the image capture switch 5 has occurred is one. This determination is made so as to provide a display form when the occupant watches the monitor image S for the second time or more that is different from a display form when the occupant in the vehicle watches the monitor image S for the first time.

When the response to step S4 is that the input operation of the image capture switch 5 is the first occurrence, the image display apparatus 100 acquires the captured images of the on-vehicle cameras 1a to 1d at a predetermined period in step S5. In this example, the captured image P is also displayed on the screen M of the display 3 in response to the input of the reverse position switch 7 (see FIG. 7).

In step S6, the image display apparatus 100 generates the single composite image K based on the acquired captured images as previously described.

In step S7, the image display apparatus 100 obtains the monitor image S in which the first image L1 showing the boundary regions R of the plurality of images and the second image L2 showing the end regions E of the vehicle are superposed on the composite image K (see FIG. 7).

In step S8, the image display apparatus 100 displays the monitor image S in which the first image L1 and the second image L2 are highlighted for a predetermined time.

The display control is shown in detail in the time chart in FIG. 9. As shown in FIG. 9, when the monitor image S starts to be displayed at a time α, displaying and non-displaying of the second image L2 showing the end regions E of the vehicle are repeated at a period of 0.5 seconds. That is, the second image L2 is displayed by blinking until the time becomes a time α+4 from the time α. Further, in this embodiment, the second image L2 is highlighted with red. Also, the first image L1 showing the boundary regions R is highlighted constantly with yellow until the time becomes the time α+4 from the time α at which the monitor image S starts to be displayed. Both the first image L1 and the second image L2 are highlighted until the time becomes the time α+4 from the time α; however, since the methods of highlighting are different, the occupant can clearly distinguish the boundary regions R and the end regions E from one another.

FIG. 10 is an illustration showing an example of the monitor image S displayed in the period from the time α to the time α+4. As shown in FIG. 10, both the first image L1 and the second image L2 are highlighted in the period from the time α at which the monitor image S starts to be displayed up to the time α+3 or the time α+4.

Returning to FIG. 9, after the predetermined time elapses in step S9 (when the time becomes the time α+4 in FIG. 9), the procedure goes to step S10.

In step S10, the control device 10 continuously highlights the end regions E, but non-highlights the first image L1 showing the boundary regions R by using black (see FIG. 9). The end regions E are continuously displayed red (non-blinking) like the state at the time before the predetermined time lapses.

The control device 10 of this embodiment changes the color of the first image L1 from yellow to black at a time before the predetermined time (the time α+3 in this example). The color is gradually changed from an accent color to a color with a low lightness according to the hue circle. With this processing, the first image L1 can be non-highlighted by using plain black lines at the end of the predetermined time, black being less noticeable as compared with yellow. As described above, since the first image L1 is displayed while the color thereof is gradually changed to a color with a low lightness, the display of the first image L1 can be changed from highlighting to non-highlighting such that a stimulus is not given to the visual perception of the occupant, i.e., such that the change is not noticeable to the occupant. By changing the display form in this way, the second image L2, which is continuously highlighted, can become more noticeable. Although it is not particularly limited, the time from the time that that color gradually changes to the end of the predetermined time (from the time α+3 to the time α+4) may be in a range from 0.5 to 3 seconds, for example, about 1 second.

FIG. 11 shows an example of the monitor image S displayed upon the passage of the predetermined time (at the time α+4 or later in this example). As shown in FIG. 11, the first image L1 showing the boundary regions R is non-highlighted by using black that has a low lightness and hence is less noticeable, and the second image L2 showing the end regions E is highlighted with red that attracts the occupant's attention more than the black used as the display color of the first image L1. After the occupant recognizes the boundary regions R and the end regions E in the predetermined period (from the time α to the time α+4 in this example), only the end regions E of the vehicle can be highlighted. As the result, the monitor image S can be displayed in a form that causes the occupant's attention to be most concentrated on the end regions E of the vehicle. The second image L2 showing the end regions E is continuously highlighted in the entire period from the start of the predetermined time to the end and even later. However, the form of highlighting is changed from blinking to non-blinking when the predetermined time elapses. Accordingly, the occupant's attention can be continuously attracted to the end regions E.

Returning again to FIG. 9, if it is determined in step S4 that the number of times the input operation of the image capture switch 5 has occurred is two or more, the procedure goes to step S10. If the number of times is two or more, meaning that the occupant has watched the monitor image S for at least one time since the occupant entered the vehicle, the first image L1 showing the boundary regions R is non-highlighted by using black, and the second image L2 showing the end regions E is highlighted with red that attracts the occupant's attention more than black does. As a result, after the occupant recognizes the boundary regions R and the end regions E through the monitor image S displayed for the predetermined time after the first time the image starts to be displayed, only the end regions E of the vehicle, which should be the most noticeable, are highlighted. As the result, the monitor image S can be displayed in a form that causes the occupant's attention to be concentrated on the end regions E of the vehicle.

The display of the monitor image S shown in FIG. 11 is continued until it is determined that the OFF operation is input to the image capture switch 5 in step S11, or until it is determined that a vehicle speed becomes a predetermined value or larger in step S12. The vehicle speed can be acquired from the vehicle-speed sensor 6 of the vehicle. The monitor image S of this embodiment is an image that the occupant uses to monitor the area around the vehicle that moves at a low speed or that is going to stop. If the vehicle moves at a predetermined speed or higher, the display of the monitor image S is stopped.

If it is determined that the OFF operation is input to the image capture switch 5 in step S11, or if it is determined that the vehicle speed becomes the predetermined value or larger in step S12, the control device 10 stops displaying of the monitor image S and the captured image P and displays the same route guide screen etc. as the route guide screen displayed when the input operation is given to the ignition switch 4 (S13).

In step S14, the processing in step S3 and later is continued until an OFF (or stop) input is given to the ignition switch 4. If the OFF input is given, the procedure goes to step S15, in which the stored number of times of the image capture switch is reset. Then, the processing is ended.

Embodiments of the present invention provide the following advantages.

With the image display apparatus 100 described herein, the relationship between the highlighting level of displaying of the first image L1 showing the boundary regions R and that of the second image L2 showing the end regions E of the vehicle is changed with time. After the predetermined time elapses, the second image L2 is relatively highlighted as compared with the first image L1. Accordingly, the monitor image S can be displayed in a form capable of making the occupant aware of both positions of the boundaries of the respective captured images and the end portions of the vehicle and capable of making the occupant's attention to be concentrated on the end portions of the vehicle. Consequently, the monitor image S can be displayed that can assist in safer vehicle operation.

Also, the display form in which the second image L2 is highlighted after the predetermined time elapses can be changed from the display form from before the predetermined time elapsed. Accordingly, the monitor image S can be displayed in the form that can cause the occupant's attention to be continuously concentrated on the end regions E of the vehicle.

Further, the form of highlighting of the second image L2 can be different from that of the first image L1 in the period when the monitor image S is started to be displayed until the predetermined time has elapsed. Accordingly, the monitor image S can be displayed in the form that allows the occupant to clearly distinguish the simultaneously highlighted first image L1 and second image L2 from one another. For example, if the first image L1 and the second image L2 are similarly highlighted by blinking, the occupant has difficulty in distinguishing the first image L1 and the second image L2 from one another. In contrast, if the first image L1 is highlighted with a high luminance and the second image L2 is highlighted by blinking, the monitor image S can be displayed in the form that allows both the boundary regions R and the end regions E to be recognized and to be clearly distinguished from one another.

In addition, after the input operation is given to the ignition switch 4 of the vehicle, if the monitor image S is displayed for a second time or more, the second image L2 showing the end regions E of the vehicle is highlighted while the first image L1 showing the boundary regions R is non-highlighted according to one example. By highlighting the boundary regions R many times, the occupant's attention can be prevented from being lost. In other words, the occupant has already recognized the boundary regions R, and the monitor image S can be displayed in the form that allows the occupant's attention to be most concentrated on the end portions E of the vehicle.

In an embodiment, an image is highlighted by blinking, and an image is non-highlighted by non-blinking. Accordingly, the occupant's attention can be concentrated on the image displayed by blinking as compared with the image displayed by non-blinking.

Also, an image can be highlighted with an advancing color that looks close to a viewer, and an image can non-highlighted with a receding color that looks far from a viewer. Accordingly, the occupant's attention can be concentrated on the image with the advancing color as compared with the image with the receding color.

Further, an image can highlighted with a relatively high luminance, and an image can non-highlighted with a relatively low luminance. Accordingly, the occupant's attention can be concentrated on the image with the high luminance as compared with the image with the low luminance.

The above-described embodiments are provided for easier understanding of the present invention and are not provided to limit the present invention. Hence, the respective elements disclosed above include elements with designs modified or equivalents within the technical scope of the teachings herein.

For example, the image display apparatus 100 is exemplified as an aspect of a vehicle image display system 1000, in particular that of an automobile. However, the present invention is not limited thereto, and embodiments of the invention could be incorporated into various movable vehicles with or without a route guidance system.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle image display apparatus, comprising:
a memory storing a program; and
a processor configured to execute the program to:
acquire a plurality of captured images of an area around a vehicle, the plurality of captured images being captured by a plurality of cameras that are mounted on the vehicle at a plurality of positions;
generate a single image that includes a representation of the vehicle and a virtual viewpoint image of the area around the vehicle formed by combining the plurality of captured images such that a linear boundary region is formed between adjacent ones of the plurality of captured images extending from the representation of the vehicle to outer edges of the single image;
display a composite image on a monitor after an input operation is given to an ignition switch of the vehicle, the composite image comprising:
a first image including markings representing each linear boundary region in the single image, the first image superposed on the single image; and
a second image including a plurality of markings, each of the plurality of markings spaced apart from an adjacent one of the plurality of markings, identifying a respective end region of the vehicle and having margins of a predetermined distance from an external surface of the vehicle in the representation of the vehicle, the second image superposed on the single image and the first image such that the plurality of markings of the second image is closer to the external surface of the vehicle in the representation of the vehicle than the markings of the first image;
highlight the first and second images superposed on the single image for a time period after a start of display of the composite image; and
change a level of highlighting of at least one of the first image or the second image after the time period has elapsed so that the second image has a greater level of highlighting than the first image after the time period elapses.

2. The vehicle image display apparatus according to claim 1,
wherein the processor is configured to highlight the second image in a first form during the time period and to highlight the second image in a second form that is different from the first form after the time period elapses.

3. The vehicle image display apparatus according to claim 1, wherein the processor is configured to highlight the second image in a first form and to highlight the first image in a second form during the time period, the first form being different from the second form.

4. The vehicle image display apparatus according to claim 1, wherein the processor is configured to highlight the second image relative to the first image from the start of display of the composite image if the composite image is being displayed for a second time or more after the input operation is given to the ignition switch of the vehicle.

5. The vehicle image display apparatus according to claim 1, wherein the processor is configured to highlight at least one of the first image or the second image by blinking the at least one of the first image or the second image and to non-highlight the first image by non-blinking the first image.

6. The vehicle image display apparatus according to claim 1, wherein the processor is configured to highlight at least one of the first image or the second image by displaying the at least one of the first image or the second image with an advancing color and to change the level of highlighting by displaying the first image with a receding color.

7. The vehicle image display apparatus according to claim 1, wherein the processor is configured to highlight at least one of the first image or the second image by displaying the at least one of the first image or the second image with a first luminance and to change the level of highlighting by displaying the first image with a second luminance that is lower than the first luminance.

8. The vehicle image display apparatus according to claim 1, wherein the processor is configured to display the composite image while the second image has the greater level of highlighting than the first image until a vehicle speed is at or above a predetermined value.

9. The vehicle image display apparatus according to claim 1, wherein the processor is configured to, during the time period, perform a transition of the first image from being highlighted to being at a lower level of highlighting.

10. The vehicle image display apparatus according to claim 1, wherein the processor is configured to display a captured image from a single camera of the plurality of cameras simultaneously with the composite image.

11. A vehicle image display apparatus, comprising:
means for acquiring a plurality of captured images of an area around a vehicle, the plurality of captured images being captured by a plurality of cameras that are mounted on the vehicle at a plurality of positions;
means for generating a single image that includes a representation of the vehicle and a virtual viewpoint image of the area around the vehicle formed by combining the plurality of captured images such that a linear boundary region is formed between adjacent ones of the plurality of captured images extending from the representation of the vehicle to outer edges of the single image;
means for displaying a composite image on a monitor after an input operation is given to an ignition switch of the vehicle, the composite image comprising:
a first image including markings representing each linear boundary region in the single image, the first image superposed on the single image; and
a second image including a plurality of markings, each of the plurality of markings identifying a respective end region of the vehicle and having margins of a predetermined distance from an external surface of the vehicle in the representation of the vehicle superposed on the single image and the first image such that the plurality of markings of the second image is closer to the external surface of the vehicle in the representation of the vehicle than the markings of the first image;
means for highlighting the first and second images in the composite image for a time period after a start of display of the composite image; and
means for changing a level of highlighting of at least one of the first image or the second image after the time period has elapsed so that the second image has a greater level of highlighting than the first image after the time period elapses.

12. A vehicle image display method, comprising:
acquiring a plurality of captured images of an area around a vehicle, the plurality of captured images being captured by a plurality of cameras that are mounted on the vehicle at a plurality of positions;
generating a single image that includes a representation of the vehicle and a virtual viewpoint image of the area around the vehicle formed by combining the plurality of captured images such that a linear boundary region is formed between adjacent ones of the plurality of captured images extending from the representation of the vehicle to outer edges of the single image;
displaying a composite image on a monitor after an input operation is given to an ignition switch of the vehicle, the composite image comprising:
a first image including markings representing each linear boundary region in the single image, the first image superposed on the single image; and
a second image including a plurality of markings, each of the plurality of markings identifying a respective end region of the vehicle and having margins of a predetermined distance from an external surface of the vehicle in the representation of the vehicle, the second image superposed on the single image and the first image such that the plurality of markings of the second image is closer to the external surface of the vehicle in the representation of the vehicle than the markings of the first image;
highlighting the first and second images in the composite image for a time period after a start of display of the composite image; and
changing a level of highlighting of at least one of the first image or the second image after the time period has elapsed so that the second image has a greater level of highlighting than the first image after the time period elapses.

13. The vehicle image display method according to claim 12, wherein highlighting the second image for the time period comprises displaying the second image in a first form; and wherein changing the level of highlighting comprises displaying the second image in a second form that is different from the first form.

14. The vehicle image display method according to claim 13,
wherein the first form is displaying the second image by blinking the second image and the second form is displaying the second image without blinking.

15. The vehicle image display method according to claim 12,
wherein highlighting the first image for the time period comprises displaying the first image in a first form; and
wherein changing the level of highlighting comprises displaying the second image in a second form that is different from the first form.

16. The vehicle image display method according to claim 15,
wherein the first form is displaying the first image with lines having a color other than black and the second form is displaying the first image with black lines.

17. The vehicle image display method according to claim 12, further comprising:
ending display of the composite image responsive to one of switching off the ignition switch of the vehicle, increasing a speed of the vehicle to or above a predetermined value, or turning off an image capture switch.

18. The vehicle image display method according to claim 17, further comprising:
receiving a request to capture an image from the image capture switch;
checking whether the request is a first request or a subsequent request; and
when the request is a subsequent request, displaying the composite image on the monitor for a second time after the input operation is given to the ignition switch of the vehicle while highlighting the second image at the greater level of highlighting than the first image beginning from the start of display of the composite image.

19. The vehicle image display apparatus according to claim 1,
wherein the representation of the vehicle comprises an outline of the vehicle surrounded by a rectangular box; and wherein the plurality of markings of the second image are within the rectangular box and between the outline of the vehicle and the markings of the first image.

20. The vehicle image display method according to claim 12,
wherein the representation of the vehicle comprises an outline of the vehicle surrounded by a rectangular box; and wherein the plurality of markings of the second image are within the rectangular box and between the outline of the vehicle and the markings of the first image.

* * * * *